US009148326B2

(12) United States Patent
Lo et al.

(10) Patent No.: US 9,148,326 B2
(45) Date of Patent: *Sep. 29, 2015

(54) TURBO CHANNEL ESTIMATION FOR OFDM SYSTEMS

(71) Applicant: AT&T Mobility II LLC, Atlanta, GA (US)

(72) Inventors: Titus Lo, Redmond, WA (US); Ruifeng Wang, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/223,266

(22) Filed: Mar. 24, 2014

(65) Prior Publication Data

US 2014/0205044 A1 Jul. 24, 2014

Related U.S. Application Data

(63) Continuation of application No. 13/557,736, filed on Jul. 25, 2012, now Pat. No. 8,681,887, which is a continuation of application No. 12/640,234, filed on Dec. 17, 2009, now Pat. No. 8,503,548, which is a (Continued)

(51) Int. Cl.
*H04L 27/28* (2006.01)
*H04L 27/26* (2006.01)
(Continued)

(52) U.S. Cl.
CPC .......... *H04L 27/2662* (2013.01); *H04L 1/0054* (2013.01); *H04L 25/0204* (2013.01); *H04L 25/0236* (2013.01); *H04L 27/261* (2013.01); *H04L 27/2647* (2013.01)

(58) Field of Classification Search
CPC ............... H04B 7/0632; H04B 7/0626; H04B 1/06–1/302; H04B 1/10–1/14; H04B 1/1027–1/126; H04B 1/005; H04B 1/0003; H03K 9/02–9/10; H04L 25/08
USPC ................. 375/260, 262, 265, 267, 284, 285, 375/324–326, 340, 341, 346–349; 370/204, 370/208, 334; 455/63, 65, 66, 133, 135, 455/137, 226.1–226.3, 296
See application file for complete search history.

(56) References Cited

U.S. PATENT DOCUMENTS 5,272,727 A 12/1993 Okanoue
5,432,821 A 7/1995 Polydoros et al.
(Continued)

OTHER PUBLICATIONS

Georghiades, Costa N. et al., "Sequence Estimation in the Presence of Random Parameters Via the EM Algorithm," IEEE Transactions on Communications, Mar. 1997, pp. 300-308, vol. 45, No. 3, 1997 IEEE.

(Continued)

*Primary Examiner* — Dac Ha
(74) *Attorney, Agent, or Firm* — Abel Law Group, LLP

(57) ABSTRACT

A system and method for estimating a channel in a wireless receiver is disclosed. The method comprises receiving a block of "n" transmitted symbols, the symbols including pilot symbols and "d" data symbols, estimating a channel using the pilot symbols to create a channel estimate, choosing a group of "m" strongest symbols from the "d" received symbols, compensating the "m" strongest symbols using the channel estimate to create a group of "m" compensated symbols, re-estimating the channel using the group of "m" compensated symbols and pilot symbols; and either (1) repeating the steps of choosing a group of "m" strongest symbols, compensating the group of "m" strongest symbols and re-estimating the channel, or (2) using a latest channel estimate to compensate all symbols within the block. The system comprises a wireless receiver having an estimator programmed according to the method.

16 Claims, 5 Drawing Sheets

Related U.S. Application Data continuation of application No. 12/255,404, filed on Oct. 21, 2008, now Pat. No. 7,656,958, which is a continuation of application No. 11/190,373, filed on Jul. 26, 2005, now Pat. No. 7,440,507, which is a continuation of application No. 09/878,555, filed on Jun. 11, 2001, now Pat. No. 6,940,914.

(51) Int. Cl.
*H04L 25/02* (2006.01)
*H04L 1/00* (2006.01)

(56) References Cited

U.S. PATENT DOCUMENTS

| | | | |
|---|---|---|---|
| 5,465,276 A | 11/1995 | Larsson et al. | |
| 5,581,580 A | 12/1996 | Lindbom et al. | |
| 5,687,198 A | 11/1997 | Sexton et al. | |
| 5,754,599 A | 5/1998 | Ling et al. | |
| 5,774,459 A | 6/1998 | Charrat | |
| 5,901,185 A | 5/1999 | Hassan | |
| 6,137,843 A | 10/2000 | Chennakeshu et al. | |
| 6,477,210 B2 | 11/2002 | Chuang et al. | |
| 6,614,857 B1 | 9/2003 | Buehrer et al. | |
| 6,654,429 B1 | 11/2003 | Li | |
| 6,680,987 B1 | 1/2004 | Beidas et al. | |
| 6,700,919 B1 | 3/2004 | Papasakellariou | |
| 6,757,241 B1 | 6/2004 | Jones et al. | |
| 6,771,591 B1 | 8/2004 | Belotserkovsky et al. | |
| 6,940,914 B1 | 9/2005 | Lo et al. | |
| 7,027,519 B2 | 4/2006 | Bao et al. | |
| 7,440,507 B1 | 10/2008 | Lo et al. | |
| 7,656,958 B2 | 2/2010 | Lo et al. | |
| 8,401,509 B1 | 3/2013 | Gupta et al. | |
| 2002/0051433 A1 | 5/2002 | Affes et al. | |
| 2004/0077322 A1* | 4/2004 | Garmonov et al. | 455/133 |

OTHER PUBLICATIONS

Hamied, Khalid A. et al., "A New Channel Estimator for Fast Start-Up Equalization," IEEE Transactions on Communications, Feb. 1991, pp. 177-181, vol. 39, No. 2, 1991 IEEE.

Kam, Pooi Yuen et al., "A Viterbi-Type Algorithm for Efficient Estimation of M-PSK Sequences over the Gaussian Channel with Unknown Carrier Phase," IEEE Transactions on Communications, Sep. 1995, pp. 2429-2433, vol. 43, No. 9, 1995 IEEE.

Kubo, Hiroshi et al., "An Adaptive Maxium-Likelihood Sequence Estimator for Fast Time-Varying Intersymbol Interference Channels," IEEE Transactions on Communications, Feb./Mar./Apr., pp. 1872-1880, vol. 42, No. 2/3/4, 1994 IEEE.

* cited by examiner

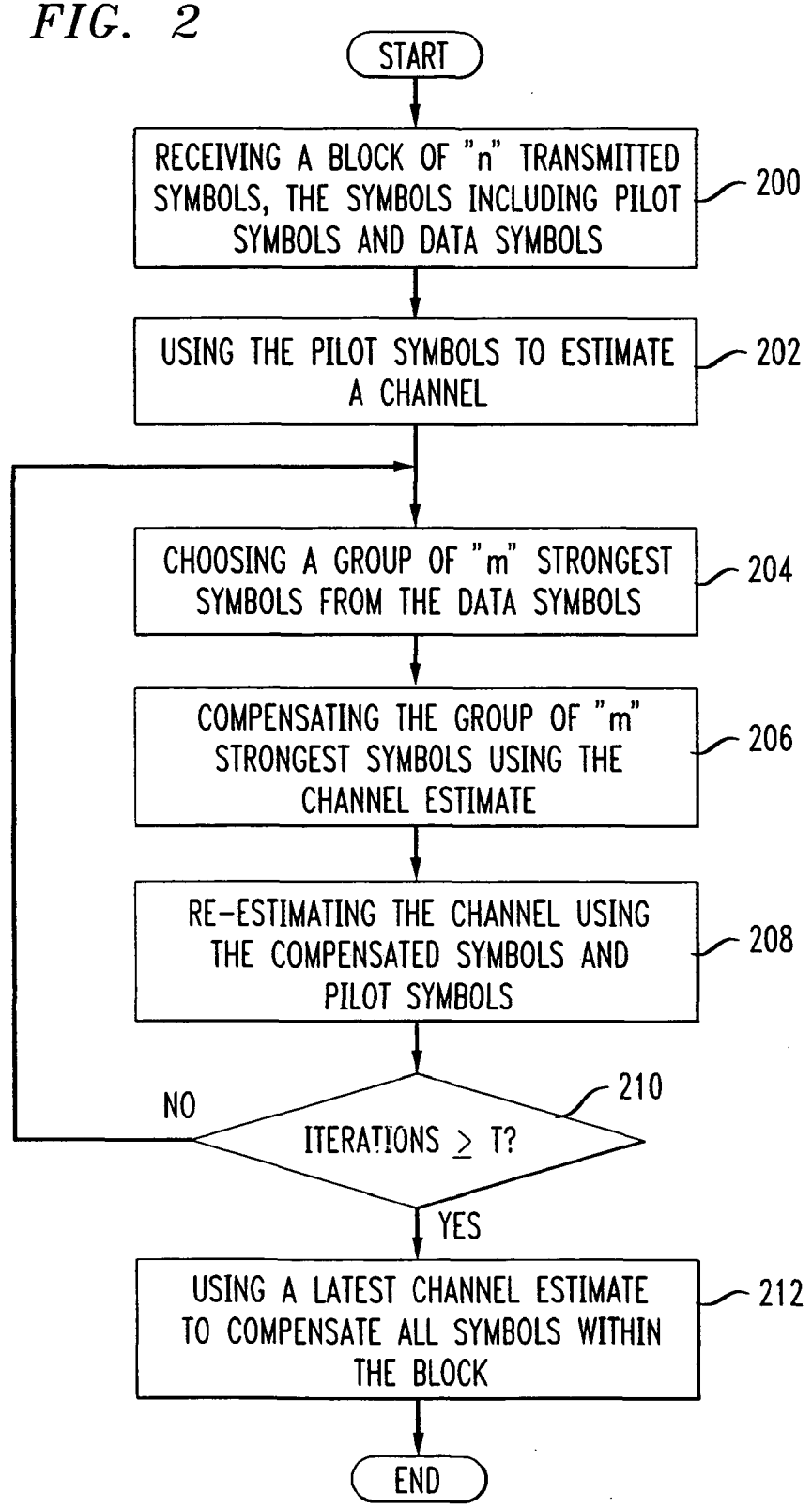

TURBO CHANNEL ESTIMATION FOR OFDM SYSTEMS

CROSS-REFERENCE TO RELATED APPLICATIONS

This application is a continuation of U.S. patent application Ser. No. 13/557,736, filed Jul. 25, 2012, entitled "Turbo Channel Estimation for OFDM Systems," naming inventors Titus Lo and Ruifeng Wang, which is a continuation of U.S. patent application Ser. No. 12/640,234 filed Dec. 17, 2009 (now U.S. Pat. No. 8,503,548, issued Aug. 6, 2013), entitled "Turbo Channel Estimation for OFDM Systems," naming inventors Titus Lo and Ruifeng Wang, which is a continuation of U.S. patent application Ser. No. 12/255,404, filed Oct. 21, 2008 (now U.S. Pat. No. 7,656,958, issued Feb. 2, 2010), entitled "Turbo Channel Estimation for OFDM Systems," naming inventors Titus Lo and Ruifeng Wang, which application is a continuation of U.S. patent application Ser. No. 11/190,373, filed Jul. 26, 2005 (now U.S. Pat. No. 7,440,507, issued Oct. 21, 2008), entitled "Turbo Channel Estimation for OFDM Systems," naming inventors Titus Lo and Ruifeng Wang, which application is a continuation of U.S. patent application Ser. No. 09/878,555, filed Jun. 11, 2001 (now U.S. Pat. No. 6,940,914, issued Sep. 6, 2005), entitled "Turbo Channel Estimation for OFDM Systems," naming inventors Titus Lo and Ruifeng Wang, which applications are incorporated herein by reference.

BACKGROUND OF THE INVENTION

1. Field of the Invention

The present invention relates to wireless communication systems and specifically to channel estimation in an orthogonal frequency division multiplexing system.

2. Discussion of Related Art

Digital multimedia applications are becoming more common as the increase in broadband communication systems continues. While the use of broadband wireless communication develops, a prevailing problem in most digital communication systems includes how to determine the original signal (block of symbols) transmitted when a noisy signal is received. One method, called Orthogonal Frequency Division Multiplexing (OFDM), enables the transmission of symbols at high data rates over hostile channels at a relatively low complexity. The OFDM standard has been adopted in some regions, such as Europe, for radio and TV. The standard is being explored in other contexts such as fixed wireless systems. As with other digital communication protocols, OFDM signals experience the same difficulty in being interpreted at a receiver.

Various channels are presently available for digital communications. These include telephone channels, data channels, broadband channels, satellite channels and fixed wireless channels. There is non-uniformity in the characteristics and bandwidth of these channels and such non-uniformity causes inter-symbol interference that inhibits faster transmission. For example, in applications such as broadband channels and fixed wireless channels, a standard problem increasing the complexity of the system is multi-path channels caused by signals reflected off buildings or other objects between the transmitter and receiver. Multiple versions of the same signal interfere with each other and cause inter-symbol interference (ISI) with an accompanying lower bit rate. It becomes difficult to extract the original information from the channel with the presence of ISI.

In order for an OFDM system to recognize transmitted signals, the receiver and transmitter must be synchronized. This synchronization involves several tasks. First, timing synchronization involves finding the "beginning" of a received OFDM symbol. The time scales of the transmitter and receiver are synchronized and any extra symbols repeated in the block to preserve orthogonality can be removed with the required accuracy. Second, frequency synchronization is necessary to estimate and compensate to for any frequency deviation in the radio carrier frequency assigned to modulate the signal. Third, sampling-clock synchronization provides a conversion of the signal produced by a fast Fourier transform (FFT) of the analog signal into an analog signal assumed to be a certain span of time between two values. Last, if a coherent modulation scheme is used, the channel transfer function $H_{l,k}$ must be estimated and compensated for.

The present invention is most concerned with the channel estimation and compensation process to preserve synchronization in OFDM systems. Channel estimators have been developed with the general purpose of using algorithms to estimate received data sequences at a wireless receiver. The goal of these channel estimators is to produce a computationally and commercially feasible maximum-likelihood (ML) parameter group reflective of the originally transmitted information.

With each block of received data at a receiver, there is unwanted noise that must be taken into account. The process of determining the subject matter on a particular channel may become so computationally complex that various solutions become infeasible. To decrease the complexity, expectation-maximum (EM) algorithms were developed that introduced an iterative process that under some circumstances produce maximum-likelihood parameter estimates. Recovery of transmitted data may be accomplished using such estimates.

One such method for estimating a channel is discussed in "Sequence Estimation in the Presence of Random Parameters Via the EM Algorithm," by Costas N. Georghiades and Jae Choong Han (*IEEE Transaction on Communications*, Vol. 45, No. 3, March 1997, pp. 300-304). The contents of this paper are incorporated herein by reference. In the Georghiades et al. paper, the authors teach about an EM algorithm wherein optimizing sequence estimates involves two steps: (1) computing the likelihood function; and (2) maximizing over the set of all admissible sequences. The EM algorithm makes use of a log-likelihood function for the complete data in a two-step iterative procedure that converges to the ML estimation.

Georghiades et al. provide several examples of applying the EM algorithm. They discuss the application of the algorithm to the random phase channel in Section III and the fading channel in Section IV. Georghiades et al. explain that with respect to the fading channel, they propose applying the EM algorithm to address the computational difficulties in implementing an optimal receiver in a random-phase case because there is no obvious way of maximizing the log-likelihood function with respect to the data sequences having large sequence lengths.

Georghiades et al. teach that applying the EM algorithm to the fading channel involves calculating the expectation step of the EM algorithm using an initial estimate of the fading $\hat{a}_o$, vector and using the estimate of the fading vector $\hat{a}_o$ to produce, by maximization, a sequence estimate. The sequence estimate is then used in another equation to produce the next fading estimate, and so on, until convergence. Convergence produces both a sequence estimator and a fading vector estimator.

The expectation ("E") portion of the EM algorithm includes computing certain values and the maximization ("M") step provides a convergence to the true ML estimate. In the maximizing step, Georghiades et al. note that their algorithm must maximize by maximizing each individual term in the sum, i.e., by making "symbol-by-symbol decisions." To improve the efficiency of the algorithm when maximization must be performed on a symbol-by-symbol basis, the Viterbi algorithm is used when trellis coding is present. However, when trellis coding is not present, Georghiades et al. seek to increase efficiency by fixing the number of iterations to two with only "very little performance loss."

The method described by Georghiades et al. is deficient in several respects. First, it only addresses a single antenna scenario. Further, the approach by Georghiades et al. only addresses re-estimation using all the compensated data symbols for Phase Shift Key (PSK) modulation. In this regard, the approach by Georghiades et al. maintains a high degree of computational complexity that prevents efficient use of the EM algorithm for channel estimation, especially when the number of data symbols in a block or frame is large.

Furthermore, the Georghiades et al. approach is limited to the PSK modulation using a single antenna receiver. Their approach is not well suited to Orthogonal Frequency Division Multiplexing (OFDM), wherein the data-stream is split into multiple RF channels, each of which is sent over a sub-carrier frequency. The S/N ratio of each of the channels in OFDM is precisely defined and is carefully monitored to ensure maximum performance.

Other related patents teach different techniques for channel estimation. For example, U.S. Pat. No. 5,465,276 to Larsson et al., which contents are incorporated herein by reference, teaches a method of adaptive tracking for a fast time-varying channel with no feedback mechanism. The channel estimate taught in the '276 patent uses an estimated time derivative of the channel estimate that is adapted with the aid of the decided symbols. The channel estimate is adapted to the radio channel by the derivate estimate and the decided symbols. The approach of the '276 patent addresses a rapidly varying signal strength and fading where the channel estimate, predicted mainly through the derivative estimate, varies relatively evenly.

The '276 patent is not well suited to the OFDM system where the wireless channel remains quasi-constant over a block of symbols because it would then provide needless derivative computations.

U.S. Pat. No. 5,687,198 to Sexton et al. teaches a method of estimating a channel by first taking an initial channel estimate using pilot symbols and compensating all the data symbols. The '198 patent next teaches taking a group of samples and computing a vector average of the group of samples. Each sample is then compared to the vector average and the largest sample is retained and the others are discarded as noise. After receiving a predetermined number of retained samples, a new channel estimate is generated containing fewer errors than previously would have been obtained if the noisy samples had been retained.

The '198 patent fails to adequately address the deficiencies in the art where all of the data symbols must be compensated for in the first channel estimate, thus increasing the computational complexity of the channel estimation process.

SUMMARY OF THE INVENTION

What is needed in the art is a method and system for performing accurate channel estimation in an OFDM system wherein the wireless channel remains quasi-constant over a block of symbols. Further what is needed is a system and method capable of use with multiple receiver antennas. Further what is needed is a system and method of increasing the efficiency of channel estimation by choosing and compensating a subset of the strongest data symbols from a set of received data symbols in the iterative process.

The present invention addresses the deficiencies of the prior art by increasing the accuracy and efficiency of channel estimation in several respects. First, the present invention comprises choosing a subset of symbols from the set of symbols received by the receiver and compensating only the subset in the iterative process of estimating the channel. The present invention further is particularly well suited to the OFDM system because of its broadband application and because the present invention reduces the structural and computational complexity which hinders the performance of OFDM systems. In OFDM systems, broadband transmission is decomposed into many parallel narrowband transmissions. The channel is flat and varies slowly relative to each to narrowband transmission. In this regard, the present invention is particularly well suited to channel estimation in OFDM broadband systems.

According to the first embodiment of the present invention, a wireless system having a receiver comprises a channel estimator associated with the receiver. An initial estimator and a symbol selector provide data to a symbol compensator, which outputs its data to the channel estimator. The channel estimator is operable to receive a block of "n" transmitted symbols. These symbols may also be referred to as frequency tones. The symbols include "p" pilot symbols and "d" data symbols. The initial estimator uses the pilot symbols to estimate a wireless transmission channel to obtain an initial estimate and the symbol selector chooses the "m" strongest symbols from the received "d" data symbols. Preferably, "m" is less than "d" such that the number of symbols chosen is less than the total number of symbols received. The symbol compensator compensates the group of "m" strongest symbols using the initial estimate and re-estimates the channel using the compensated symbols and pilot symbols. The value of "m" may also be chosen to equal "d" in order to achieve best channel estimate at the cost of computational complexity.

The channel estimator next will either repeat the steps of choosing the group of "m" strongest symbols, compensating the "m" strongest data symbols and re-estimating the channel, or using a latest channel estimate to compensate all the symbols within the block. The functionality of the present invention may be implemented in the wireless receiver wherein the channel estimation functionality is programmed, for example, using a digital signal processor (DSP) or an application specific integrated chip (ASIC) and imbedded into the wireless system design software for accomplishing the steps set forth herein. One of ordinary skill in the art will understand the necessary hardware components to implement the present invention.

The second embodiment of the present invention relates to a method of estimating a channel in a wireless receiver. The method comprises receiving a block of "n" transmitted symbols, the symbols including "p" pilot symbols and "d" data symbols, using the pilot symbols to estimate a wireless transmission channel to obtain an initial estimate, choosing a group of "m" strongest symbols from the "d" received symbols, compensating the "m" strongest symbols using the initial estimate, and re-estimating the channel using the compensated symbols and pilot symbols. Finally, the method comprises either repeating the steps of choosing "m" strongest symbols, compensating the "m" strongest symbols and re-estimating the channel, or using a latest channel estimate to compensate all symbols within the block. Preferably, according to the second embodiment of the invention, "m" is less than "d", although that is not a requirement of the invention.

In another aspect of the second embodiment of the invention, after the "m" strongest symbols are chosen and compensated, and a channel re-estimate is performed, if a predetermined number of iterations has not yet occurred, another set of "x" symbols are chosen for compensation. Preferably, "x" is less than "m" but it may also be equal to or greater than "m". Preferably, the "x" strongest symbols are chosen for another iteration of compensating symbols. The "x" set of symbols may be chosen to further refine the compensation of symbols in preparation for the step of re-estimating the channel using compensated data symbols and the pilot symbols.

BRIEF DESCRIPTION OF THE DRAWINGS

The foregoing advantages of the present invention will be apparent from the following detailed description of several embodiments of the invention with reference to the corresponding accompanying drawings, in which:

FIG. 2 illustrates the second embodiment of the invention;

DETAILED DESCRIPTION OF THE INVENTION

Figure 1:
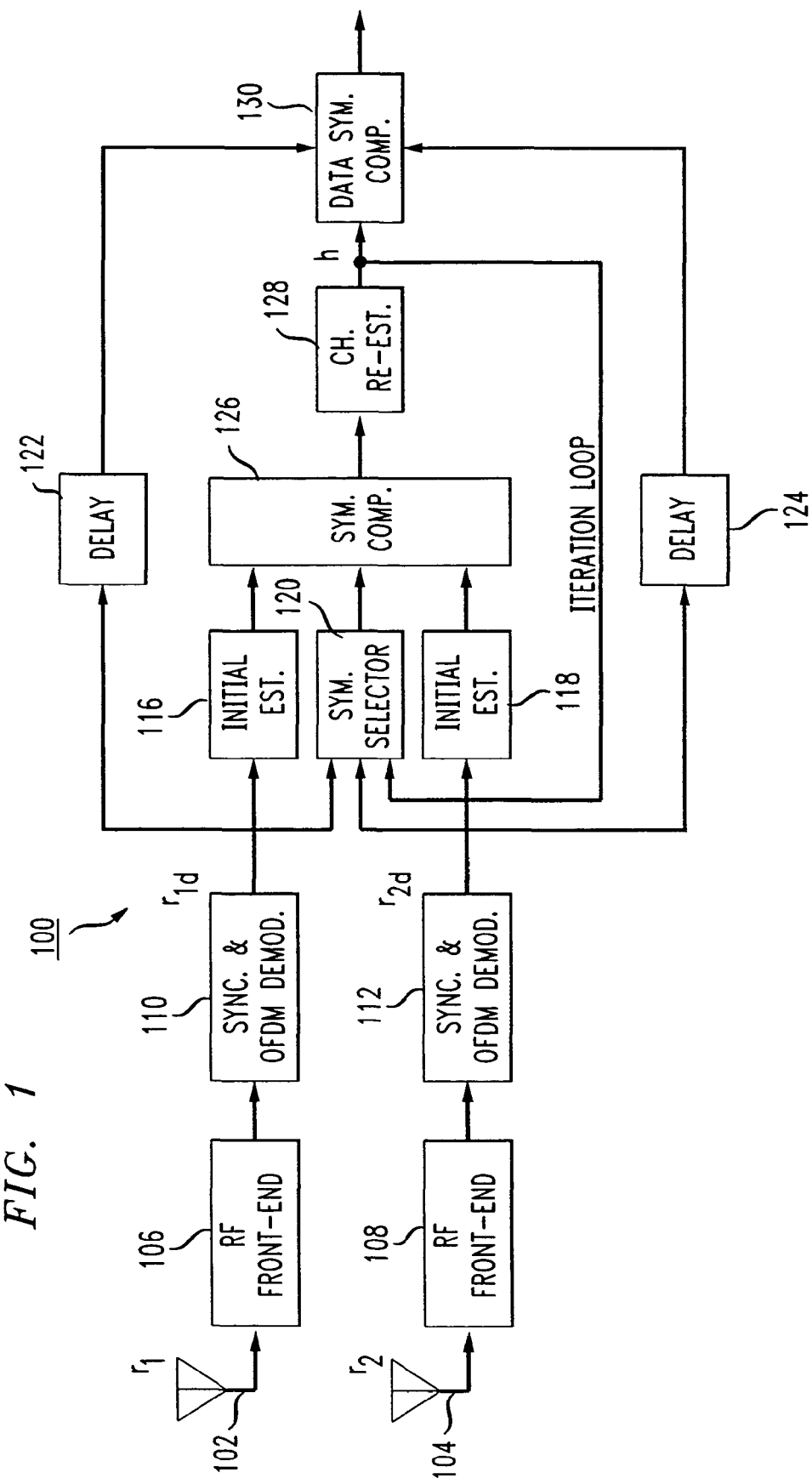
FIG. 1 illustrates the first embodiment of the present invention in a multiple antenna scenario.

The present invention may be understood with reference to the drawings. FIG. 1 illustrates the first embodiment of the invention. A communication system receiver 100 comprises an analog front-end having two antenna receivers 102 and 104 for receiving data $r_1$ and $r_2$ respectively. The respective RF front ends 106 and 108 receive the signal where they are synchronized and demodulated from the OFDM signals as shown in blocks 110 and 112. As is known, the received signals $r_1$ and $r_2$ will experience different fading characteristics and their average strengths for $r_{1d}$ and $r_{2d}$ (the received signals $r_1$ and $r_2$ after they are OFDM demodulated) are different.

The demodulated data from block 110 is transmitted to an initial channel estimator 116 and a symbol selector 120. Similarly, the demodulated data from block 112 is transmitted to an initial channel estimator 118 and a symbol selector 120. The $r_{1d}$ demodulated data is delayed 122 and the $r_{2d}$ demodulated data is delayed 124. The symbol selector 120 performs three basic steps. First, the selector 120 compares the signal strengths between $r_{1d}$ and $r_{2d}$ using means known to those of skill in the art, such as maximum signal strength, average signal strength, or using the first signal strength received by the two antennas. Depending on the comparative method used, the selector 120 chooses the strongest set of signals. Next, from the stronger set of signals, the selector chooses the strongest data symbols based on the individual data symbol's strength. Finally, the selector 120 chooses data symbols from the weaker signal sequence at frequency tone positions corresponding to the selected data symbols from the strongest signal sequences. Both sets of data symbols are transmitted to a symbol compensator 126 to recover the original symbols using diversity combining or beam forming techniques.

The symbol compensator 126 performs compensation for the initial estimated data and the symbols selected by the symbol selector 120. Preferably, the symbol selector 120 is programmed to select the "m" strongest data symbols from the stronger sequences of the received sequences $r_{1d}$ and $r_{2d}$. The symbol compensator 126 recovers the selected data symbols by using diversity combining, such as maximal ratio combining (MRC) or minimum mean squared-error (MMSE) combining, or beam forming techniques. Other techniques may be used and are known to those of skill in the art.

While only two input antennas 102,104 are shown, the present invention may include more than two antennas to further improve the compensation performance of the system. In such a case, the symbol selector 120 will be modified to determine the relative strengths of the various sequences received and make determinations of which is the strongest sequence from which to choose the "m" strongest data symbols. Various combinations of the concept of using the frequency tone positions from the strongest sequence for choosing "m" data symbols at the same frequency tone positions from the weaker sequences may be used. For example, if four data sequences were received from four receiving antennas, then the strongest data sequence may be used for choosing the "m" strongest data symbols and "m" symbols will be chosen from the three weaker data sequences at the same frequency tone positions. Or, of the four sequences received, the symbol selector 120 may choose the two strongest sequences (say, for example, the first and third) and make calculated decisions regarding which data symbol frequency tone positions to use for choosing data symbols from the second and fourth sequences, i.e., whether the "m" strongest data symbol frequency tone positions from the first sequence will be used to choose "m" data symbols from the weaker second sequence, and the "m" strongest data symbols from the third sequence will be used for choosing the "m" data symbols at the same frequency tone position from the weaker fourth sequence.

The compensated symbols are transmitted to the channel re-estimator 128 that produced a channel estimation result "h". Following the channel estimation 128, iterative loops may be used to repeat the steps of symbol selection, 114, 120, symbol compensation 126 and channel re-estimation 128. A predetermined value of "T" may be programmed for controlling the number of iterative loops. The system 100 will continue to iterate until the value of "T" is met or exceeded. Once the value of "T" is met, the latest channel estimation "h" may be used by the data symbol compensator 130 for recovering data symbols that are transmitted to a demodulator and decoder (not shown) to obtain the original binary sequences.

Further, in the iterative process, a different value from "m" may be used following the first pass-through. For example, the channel estimator (or re-estimator) 128 or the symbol selector 120 may determine a value of "x" after the first pass-through and if the number of iterations "T" has not been met. The value of "x" would preferably be less than "m" but may be equal to or greater than "m". The "x" strongest symbols may then be chosen by the symbol selector 120 and used for symbol compensation 126 and channel re-estimation 128.

FIG. 2 illustrates a second embodiment of the invention related to a method of estimating a channel in a wireless receiver. The steps outlined in FIG. 2 are for illustration only and are not meant to be limited to the exact order or procedure but set forth the general concept of the invention. First, the receiver receives a block of "n" transmitted symbols (200). The symbols preferably include pilot symbols and may include "d" data symbols. Using the pilot symbols, a wireless channel is estimated (202). If this is the first pass through the estimation and compensation process, then the channel estimate at this stage may be referred to as an "initial" estimate. A set or group of "m" strongest symbols is chosen from the received "d" data symbols (204). Next, the "m" strongest symbols are compensated (206) using the channel estimate from step 202. The strongest symbols are determined by signal strength or by using a predetermined signal-to-noise ratio.

When multiple receive antennas are used as shown in FIG. 1, diversity combining or beam forming may be utilized to improve the compensation performance in step 206. Following compensation, the method comprises re-estimating the channel using the compensated symbols and pilot symbols (208).

The symbols chosen to be part of the group in step 204 are determined preferably on signal strength. A predetermined criteria will preferably be established in which symbols in the block having a signal strength above the criteria will be chosen to be in the group of "m" symbols to be compensated. However, other criteria may also be set for determining which symbols will be compensated.

Following the re-estimation of the channel, the method determines whether a pre-determined ed number of iterations, "T", have occurred. If the number of iterations is less than "T" (210), the process returns and proceeds again at step (204). If the number of iterations is equal to or greater than "T" as determined in step (210), then the process uses a latest channel estimate to compensate all data symbols within the block (212). Step 210 may be equivalently asked as whether the number of iterations is greater than or equal to "T" or whether the number of iterations is less than "T." The different branches from step 210 of course will flip-flop between "yes" and "no" depending on how the system is programmed to ask the question. According to the preferred aspect of the second embodiment of the invention, "m" is less than "d." However, in another aspect of the invention, "m" equals "d." The choice for the value of "T" may be based on a number of factors, such as the DSP Mips requirements.

Figure 3A:
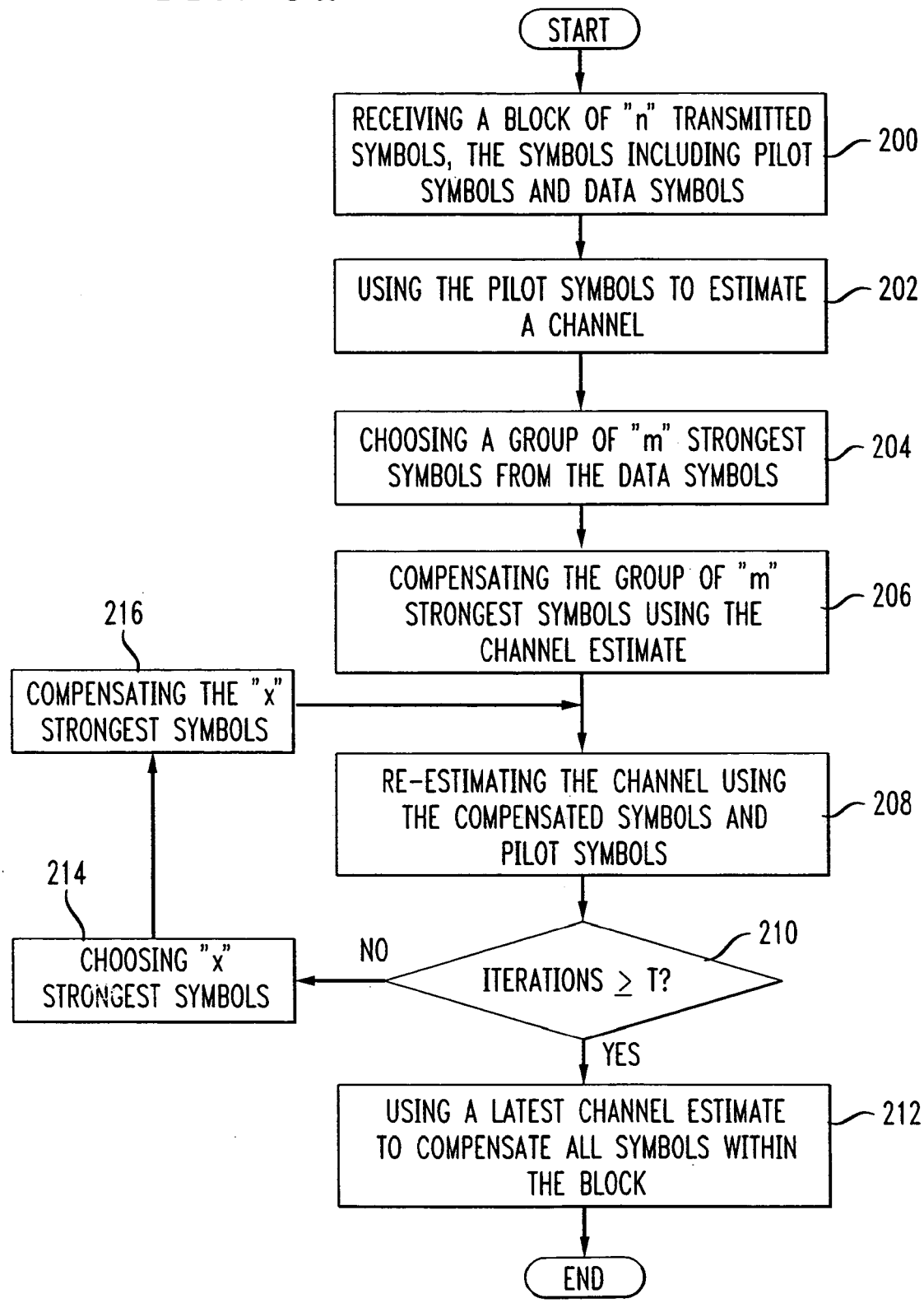
FIG. 3a illustrates an aspect of the second embodiment of the invention.

FIG. 3a illustrates yet another aspect of the second embodiment of the invention. Steps 200 through 210 are the same as those shown in FIG. 2. FIG. 3a illustrates a different branch of the method after block 210. As shown in FIG. 3a, if the number of iterations is less than "T" (210), then a number "x" of the strongest symbols are chosen (214). The "x" strongest symbols are compensated and the process proceeds to step 208 where the channel is re-estimated using the "x" number of compensated symbols and the pilot symbols. The value of "x" is preferably less than "m" in this example.

As shown in FIG. 3a, if the number of iterations is equal to or greater than "T", then the process continues to use the latest channel estimate to compensate all the symbols within the block (212). With the new branch introduced in FIG. 3a, the process may be more efficient by continuing to narrow down the strongest symbols used for compensation.

Figure 3B:
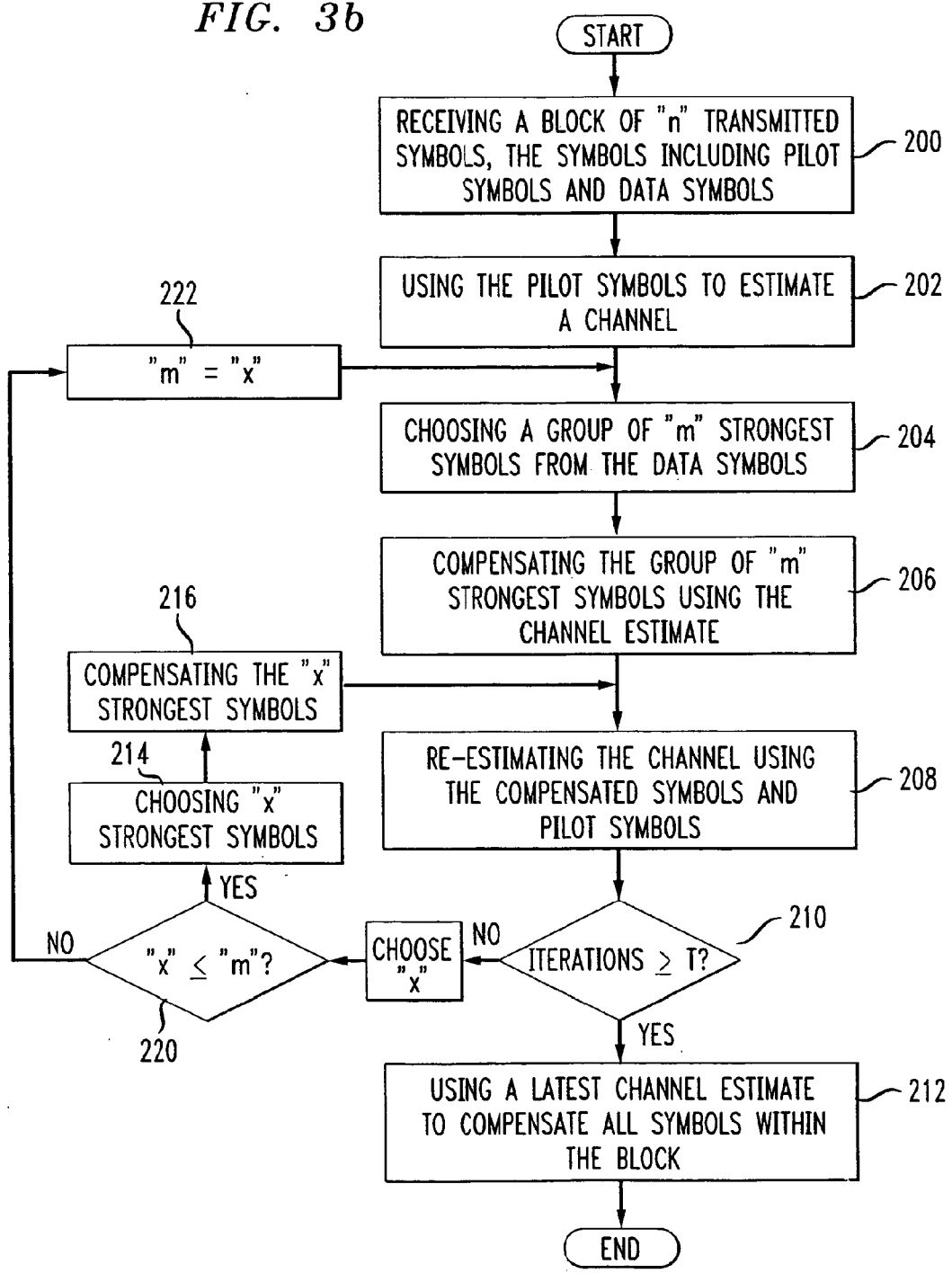
FIG. 3b illustrates yet another aspect of the second embodiment of the invention.

In FIG. 3b, a variation on the method shown in FIG. 3a is illustrated. In this aspect of the second embodiment of the invention, steps 200-210 are the same as that shown in FIG. 2, and a new branch is shown stemming from step 210. In FIG. 3b, if the number of iterations is less than "T" (210), then a value of "x" is chosen (218). If "x" is less then "m", then the method proceeds to steps 214 and 216 as shown in FIG. 3a. However, if "x" is equal to or greater than "m" (220), then "m" is set equal to "x" and the method proceeds at step 204 with choosing a group of the "m" strongest symbols from the "d" received symbols. The value of "x" may equal "m" and may be either greater than or less than "m." In this regard, for efficiency purposes, if "x" is less than "m", a smaller number of symbols may be chosen from the block for the repeated step of choosing a group of strongest symbols to compensate and use for channel estimation. Similarly, if predetermined criteria indicate, "x" may be greater than "m" in order to have a larger group of the strongest symbols compensated in the iterative process.

Figure 4:
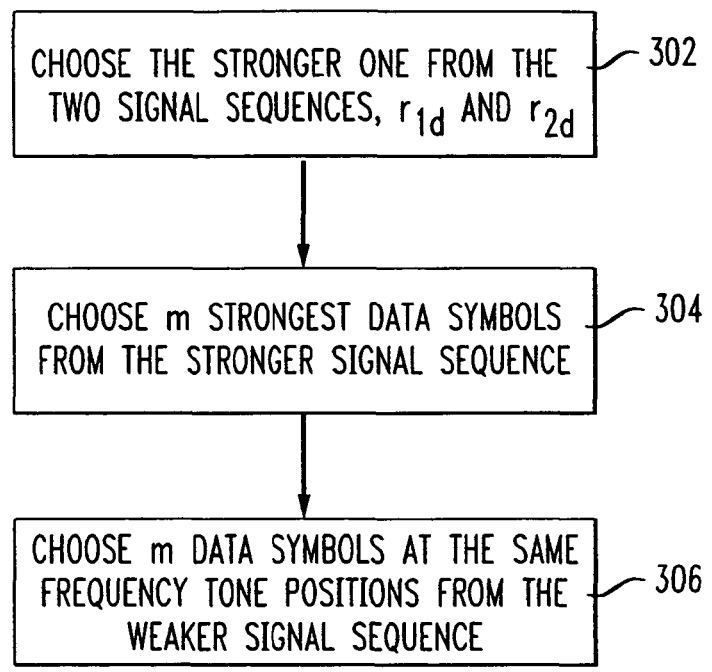
FIG. 4 illustrates a variation on the second embodiment of the invention.

Another aspect of the second embodiment of the invention, shown in FIG. 4, relates to step 204: choosing a group of "m" strongest symbols for compensation. In broad terms, as set forth above, a subset of "m" of the strongest symbols are chosen. However, other methods of choosing and transmitting a set or sets of data symbols to a symbol compensator for data recover may be employed.

One such system has been described above in connection with the first embodiment of the invention. This variation on step 204 is shown in FIG. 4 and is preferably performed by the symbol selector 120. The selector 120 compares the signal strengths between $r_{1d}$ and $r_{2d}$ using means known to those of skill in the art, such as maximum signal strength, average signal strength, or using the first signal strength received by the two antennas. Depending on the comparative method used, the selector 120 chooses (302) the strongest set of signals. Next, from the stronger set of signals, the selector chooses the strongest data symbols based on the individual data symbol's strength (304). Finally, the selector 120 chooses data symbols from the weaker signal sequence at the corresponding frequency tone positions as the selected data symbols from the strongest signal sequences (306).

Both sets of data symbols are transmitted to the symbol compensation block 126 to recover the original symbols using diversity combining or beam forming techniques. While the example shown in FIG. 4 relates to two received sets of data sequences, the present invention may be expanded to include a plurality of signal sequences received from a plurality of receiving antennas. In such case, the concept of choosing a strongest set of sequences of the received sequences and using a subset of "m" strongest symbols from the chosen sequence may be modified to apply in various ways to systems with more than two antennas.

The method may be implemented using a system comprising a wireless receiver having an estimator unit programmed, for example, using a DSP or an ASIC and imbedded into the wireless system design software for accomplishing the steps set forth according to the various aspects of the method. This implementation will be understood by one of skill in the art with the information provided herein regarding the invention.

Although the above description may contain specific details, they should not be cons-trued as limiting the claims in any way. Other configurations of the described embodiments of the invention are part of the scope of this invention. Accordingly, the appended claims and their legal equivalents should only define the invention, rather than any specific examples given.

The invention claimed is:
1. A method comprising:
  generating first compensated data symbols based on a plurality of initial channel estimates and a first group of data symbols of a plurality of received blocks of symbols, the plurality of received blocks of symbols being received using corresponding receiver paths of a plurality of receiver paths, wherein individual channel estimates of the plurality of initial channel estimates correspond to respective receiver paths of the plurality of receiver paths of a communications system, wherein generating first compensated data symbols comprises:
    selecting, according to individual data symbol strength, strongest data symbols of a received block of a selected signal, the selected signal being selected based on signal strength, from a plurality of signals received using respective receiver paths of the plurality of receiver paths; and selecting, from a second received block of another signal of the plurality of signals, data symbols at frequency tone positions corresponding to frequency tone positions of the strongest data symbols, wherein the strongest data symbols and the data symbols are included in the first group of data symbols;

generating a second channel estimate using the first compensated data symbols and pilot symbols of the plurality of received blocks of symbols; and generating second compensated data symbols based on delayed versions of the plurality of received blocks of symbols and the second channel estimate.

2. The method, as recited in claim 1, further comprising:
receiving the plurality of received blocks of symbols using corresponding receiver paths of the plurality of receiver paths.

3. The method, as recited in claim 1, further comprising:
demodulating the plurality of signals.

4. The method, as recited in claim 1, wherein generating the second channel estimate comprises:
updating the second channel estimate based on additional data symbols.

5. The method, as recited in claim 4, wherein the additional data symbols include a number of data symbols different from a number of symbols included in the first group of data symbols.

6. The method, as recited in claim 1, wherein generating second compensated data symbols is based on all data symbols of the plurality of received blocks of symbols.

7. The method, as recited in claim 1, further comprising:
recovering an original binary sequence based on the second compensated data symbols.

8. An apparatus comprising:
a symbol selector configured to select, according to individual data symbol strength, strongest data symbols from a received block of a selected signal, the selected signal being selected from a plurality of signals based on signal strength, and further configured to select, from another received block of another signal of the plurality of signals, data symbols at frequency tone positions corresponding to frequency tone positions of the strongest data symbols, wherein the strongest data symbols and the data symbols are included in a first group of data symbols, and wherein the plurality of signals are received using respective receiver paths of a plurality of receiver paths;

a compensation circuit configured to generate first compensated data symbols based on a plurality of initial channel estimates and the first group of data symbols of a plurality of received blocks of symbols;

a channel re-estimator configured to re-estimate the channel using the first compensated data symbols and pilot symbols of the plurality of received blocks of symbols to generate a second channel estimate; and a second compensation circuit configured to generate second compensated data symbols based on delayed versions of the plurality of received blocks of symbols and the second channel estimate.

9. The apparatus, as recited in claim 8, further comprising:
the plurality of receiver paths configured to receive corresponding received blocks of symbols of the plurality of received blocks of symbols, wherein individual received blocks of symbols of the plurality of received blocks of symbols and individual channel estimates of the plurality of initial channel estimates correspond to respective receiver paths of a plurality of receiver paths.

10. The apparatus, as recited in claim 8, further comprising:
a demodulator configured to demodulate the plurality of signals to generate corresponding received blocks of symbols of the plurality of received blocks of symbols.

11. The apparatus, as recited in claim 8, wherein the channel re-estimator is further configured to update the second channel estimate based on additional data symbols of the plurality of received blocks of symbols.

12. The apparatus, as recited in claim 11, wherein the additional data symbols include a number of data symbols different from a number of symbols included in the first group of data symbols.

13. The apparatus, as recited in claim 8, wherein the second compensation circuit generates second compensated data symbols based on all data symbols of the plurality of received blocks of symbols.

14. The apparatus, as recited in claim 8, wherein the second compensation circuit recovers an original binary sequence based on the second compensated data symbols.

15. An apparatus comprising:
means for selecting according to individual data symbol strength, strongest data symbols from a received block of a selected signal, the selected signal being selected from a plurality of signals based on signal strength, and further configured to select, from another signal of the plurality of signals, data symbols at frequency tone positions corresponding to frequency tone positions of the strongest data symbols, wherein the the strongest data symbols and the data symbols are included in a first group of data symbols;

means for generating first compensated data symbols based on a plurality of initial channel estimates and the first group of data symbols of a plurality of received blocks of symbols;

means for re-estimating the channel using the first compensated data symbols and pilot symbols of the plurality of received blocks of symbols to generate a second channel estimate; and means for generating second compensated data symbols based on delayed versions of the plurality of received blocks of symbols and the second channel estimate.

16. The apparatus, as recited in claim 15, further comprising:
means for receiving the plurality of signals using a plurality of corresponding receiver paths, wherein individual received blocks of symbols of the plurality of received blocks of symbols and individual channel estimates of the plurality of initial channel estimates correspond to respective receiver paths of the plurality of receiver paths.

* * * * *

UNITED STATES PATENT AND TRADEMARK OFFICE
CERTIFICATE OF CORRECTION

PATENT NO. : 9,148,326 B2
APPLICATION NO. : 14/223266
DATED : September 29, 2015
INVENTOR(S) : Titus Lo and Ruifeng Wang It is certified that error appears in the above-identified patent and that said Letters Patent is hereby corrected as shown below:

Claims

Column 10, Line 37, in claim 15, please replace "the the" with --the--.

Signed and Sealed this
Twenty-second Day of March, 2016

Michelle K. Lee
*Director of the United States Patent and Trademark Office*